United States Patent
Garnett et al.

(10) Patent No.: US 6,222,333 B1
(45) Date of Patent: Apr. 24, 2001

(54) DC BRUSHLESS MOTOR CONTROLLER APPARATUS AND METHOD

(75) Inventors: Ronald E. Garnett, Lexington; Mitchell R. Rowlette, Berea, both of KY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/459,205

(22) Filed: Dec. 10, 1999

(51) Int. Cl.[7] .................................................. H02P 1/18
(52) U.S. Cl. ............................................. 318/254; 388/805
(58) Field of Search ..................................... 318/254, 439; 388/804, 805, 811, 812, 813, 819, 820, 829, 831

(56) References Cited

U.S. PATENT DOCUMENTS

| | | | |
|---|---|---|---|
| 5,497,094 | * | 3/1996 | George ................................. 324/529 |
| 5,677,605 | * | 10/1997 | Cambier et al. ..................... 318/254 |
| 5,878,189 | * | 3/1999 | Lankin et al. ....................... 388/801 |
| 5,896,487 | * | 4/1999 | Masten et al. ....................... 388/811 |

* cited by examiner

Primary Examiner—Robert E. Nappi
Assistant Examiner—Rina I. Duda
(74) Attorney, Agent, or Firm—Russell E. Baumann; Frederick J. Telecky, Jr.

(57) ABSTRACT

A low cost, microprocessor (U1) based motor controller (10) for driving a half-wave, multiple speed, reversible, DC brushless motor (30) directly from standard AC 50/60 Hz power. A large number of different speed and rotation direction combinations may be chosen before or after the motor is installed using configuration resistors ($R_{col1}$, $R_{row1}$). SIDACs (TS2, TS3) each serially connected to a diode (D6, D5) are connected across respective coils (COIL_1, COIL_2) to clamp the flyback energy in the windings to a few volts when triggered and allow Vemf to float when not triggered. The control adjusts the relative phase timing of commutation during start-up and during running to enhance efficiency. Locked rotor protection is provided by limiting start-up time to a selected period which is followed by a selected cool-off time.

7 Claims, 9 Drawing Sheets

US 6,222,333 B1

DC BRUSHLESS MOTOR CONTROLLER APPARATUS AND METHOD

FIELD OF THE INVENTION

This invention relates generally to dynamo-electric machines and more particularly to controllers for DC brushless electric motors.

BACKGROUND OF THE INVENTION

It is conventional to use power MOSFET transistors to gate power to separate motor phase windings in order to minimize the number of transistors required and related drive circuitry, while still maintaining significant torque thereby minimizing cost. When a particular MOSFET transistor is gated on, current flows through the attached coil winding. When the same transistor is turned off, the energy field contained within the coil collapses creating a large voltage potential ($V_{flyback}$) across the power transistor. This causes the transistor to go into an avalanche breakdown mode at its specified breakdown voltage ($V_{breakdown}$). This effect limits the $V_{flyback}$ to $V_{breakdown}$. The flyback energy is then dissipated between the coil and the transistor, creating a temperature rise in the power transistor proportional to $I_{flyback} \times V_{breakdown}$.

For low power designs, this flyback temperature rise is tolerable, as the energy contained in the coil is relatively small. However, for higher power designs, the temperature rise is excessive and destroys the transistor. Also, the flyback energy is converted into heat instead of motion, so an efficiency loss is realized. Ideally, $V_{flyback}$ should be clamped with a diode so that the majority of the energy dissipates in the coil. However, after the flyback energy dissipates, and after the coil winding passes a new pole, the coil tries to generate an EMF voltage ($V_{emf}$) of the same polarity as $V_{flyback}$. If a clamping diode is used, $V_{emf}$ is also clamped creating a breaking effect thereby resulting in a major loss of energy.

SUMMARY OF THE INVENTION

An object of the invention is to provide a DC brushless motor controller which overcomes the prior art limitations noted above. Another object of the invention is the provision of such a controller which is a low cost, microprocessor-based controller which drives the motor with improved efficiency.

Briefly in accordance with the invention, SIDACs are used in series with diodes to clamp $V_{flyback}$ yet allow $V_{emf}$ to float to its natural level. The SIDACs are essentially TRIACs which trigger at a particular voltage higher than $V_{emf}$ and lower than $V_{breakdown}$. When triggered, the SIDAC acts like a diode, clamping the flyback to a few volts. When not triggered, the SIDAC acts like an open, allowing $V_{emf}$ to float. A Hall Effect sensor is used in the preferred embodiment to sense the rotor position with a particular winding of the motor powered at the Hall Effect sensor trigger point. According to a feature of the invention, the phase timings are advanced or delayed to optimize performance and efficiency for a particular motor configuration of winding parameters and the torque and speed requirements. The motor is started with a relative phase advance of zero degrees and once the motor is running and stabilized, the control retards or advances the timing, ensuring the motor speed is within tolerance to optimize performance and efficiency. According to another feature of the invention, start-up time is limited to a first selected time period, e.g., two seconds, then, should the motor not start or if the signals are overly erratic, the control shuts down the motor for a second selected time period, e.g., sixteen seconds, allowing the motor and the control to cool down. According to a feature of the invention, two configuration resistors are provided for selecting from a matrix of a large number (e.g., 400) different combinations of target speeds, rotation direction and current limits. One such configuration resistor can be used during manufacture to select a range for the other such resistor which can be fixed internally or attached externally through a set of leads so that the motor configuration can be changed by an external control or relay.

BRIEF DESCRIPTION OF THE DRAWINGS

Other objects, advantages and details of the novel and improved motor control of this invention appear in the following detailed description of the preferred embodiment of the invention, the detailed description referring to the drawings in which.

DETAILED DESCRIPTION OF THE PREFERRED EMBODIMENTS

Figure 1A:
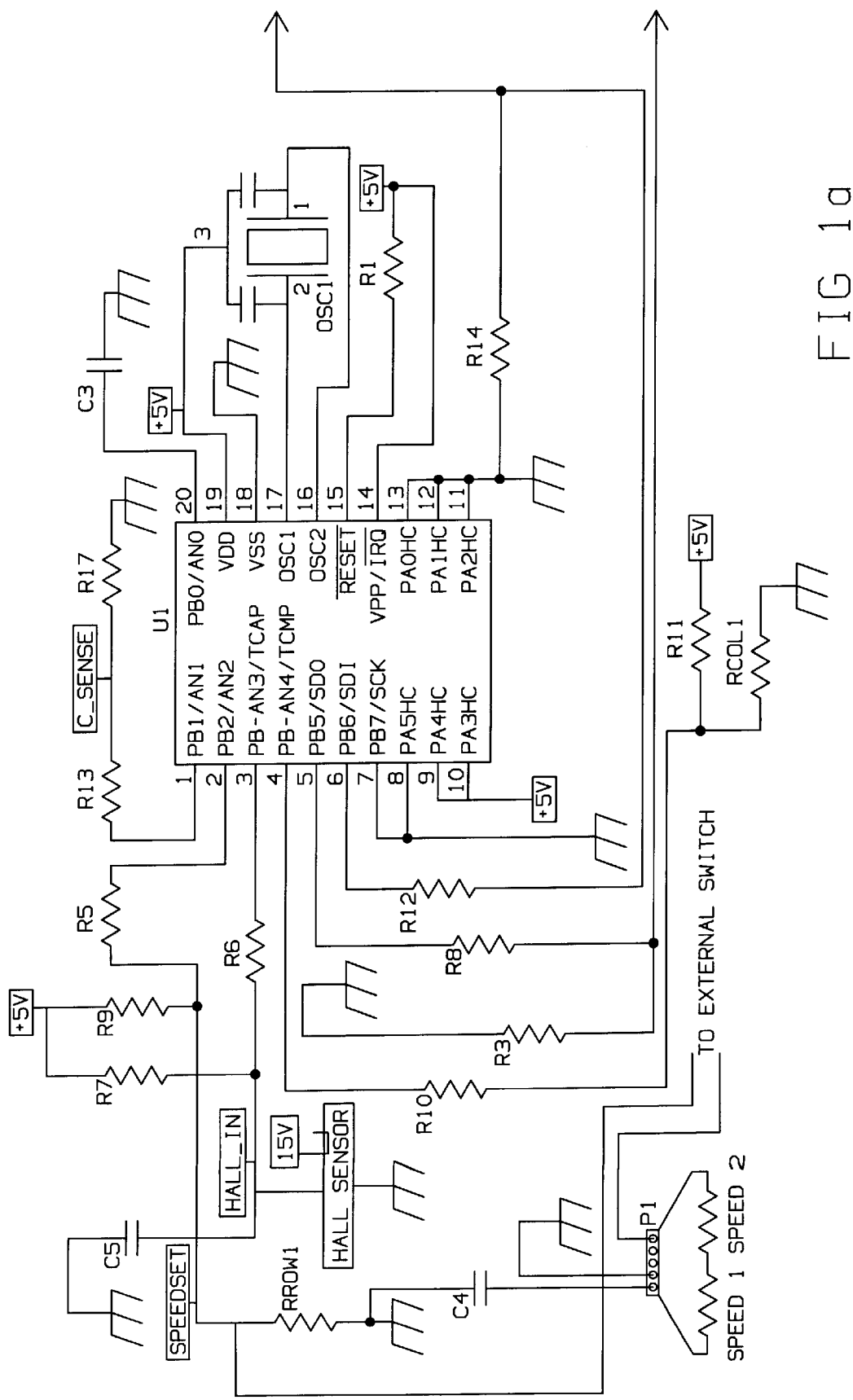
FIGS. 1a–1c is a schematic wiring diagram of a microprocessor based motor controller made in accordance with a preferred embodiment of the invention.
Figure 1B:
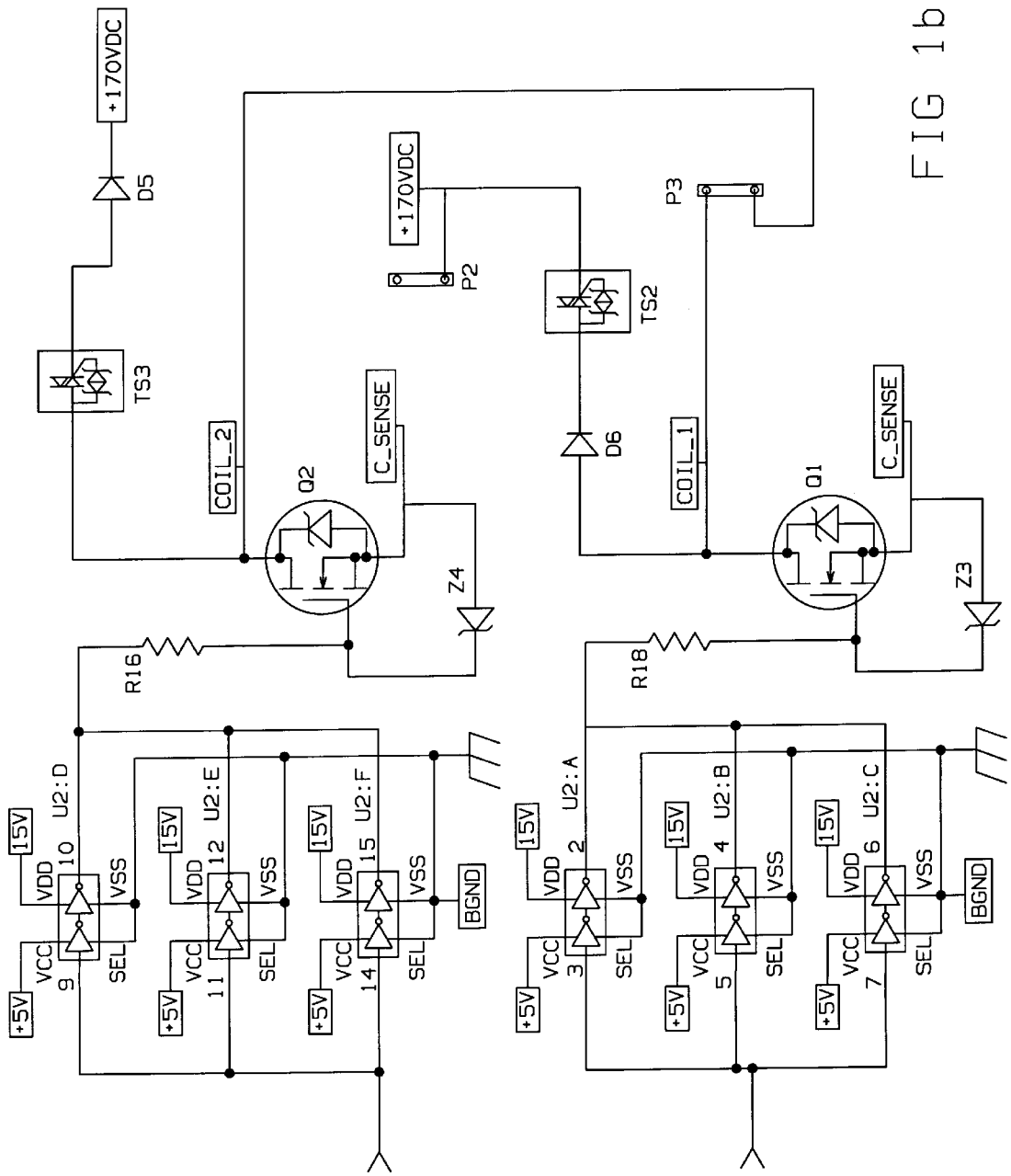
Figure 1C:
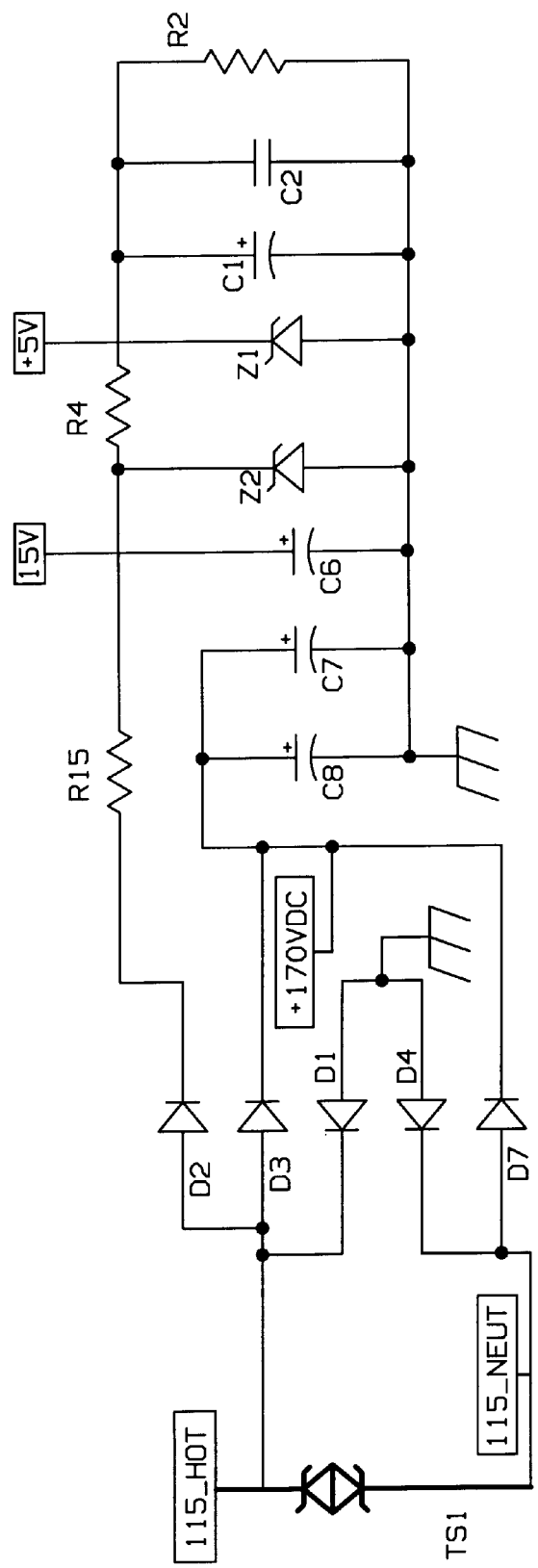

With particular reference to FIGS. 1a–1c, motor control 10 comprises microprocessor U1 used to time motor signals in response to inputs from a Hall Effect sensor 32 (see FIG. 2), a current sense resistor R17 and speed/direction matrix row and column resistors $R_{ROW1}$, $R_{COL1}$, to be discussed. The power supply for the control comprises a high voltage bridge made up of diodes D1, D3, D4 and D7 providing 170 VDC with a metal oxide varistor TS1 connected across 115 VAC and neutral to suppress power line spikes. Filter capacitors C7 and C8 are connected between the 170 VDC line and common. 115 VAC is fed through rectifier D2 and current limiting resistor R15 to form the low voltage power supply which shares a common ground with the high voltage power supply. Filter capacitor C6 is connected between the low voltage line and common while zener diode Z2, connected between the low voltage line and common, limits the gate drive supply voltage to 15v DC. Resistor R4, connected to the 15v line, serves as a low voltage power supply current limiting resistor while zener diode Z1, connected between the low voltage line and common, is used to limit the microcontroller supply voltage to 5.1v DC. Capacitors C1, C2, connected across the low voltage power line and common, serve as filter capacitors while resistor R2 is a pull down resistor for the low voltage power supply.

Resistor R17 is a current sense resistor, signal C_SENSE, connected between common and pin 1 of microcontroller U1 through current limiting resistor R13. Row resistor $R_{row1}$ is connected on one side to common. The other side of row resistor $R_{row1}$, signal SPEEDSET, is connected to the +5v source through reference resistor R9 for the target speed/direction matrix and to pin 2 of the microcontroller through current limiting resistor R5. Signal SPEEDSET is also connected to connector P1, a connection point for external wiring to enable speed and direction changes for the motor, to an external switch not shown, and to low voltage supply filter capacitor C4, connected to common. Hall Effect sensor 12 is connected on one side to common and it provides a signal HALL_IN connected to pin 3 of the microcontroller through current limiting resistor R6 and to the +5v source through pull-up resistor R7. A filter capacitor C5 is connected between HALL_IN signal and common. Column resistor $R_{col1}$ is a column resistor for the target speed/direction matrix and is connected at one side to common and on the other side to the +5v source through a reference resistor R11 and to the microcontroller speed set input, pin 4 through current limiting resistor R10.

Level shifter U2, used to convert 5v CMOS signals to 12–15v MOSFET gate signals are connected on the input side to transistor drive output pin 5 of microcontroller U1 through current limiting resistor R8 and to transistor drive output pin 6 through current limiting resistor R12, respectively. Pull down resistors R3 and R14, connected between the current limiting resistors and common, are used for the respective coil drive signals.

Microprocessor U1, pins 7, 8 and 11–13 are connected to common and pins 9 and 10 are connected to the +5v source. The +5v source is also connected to the IRQ' pin 14 and through pull-up resistor R1 for the REST signal to RESET' pin 15 of the microprocessor.

VDD pin 19 of microprocessor U1 is connected to the +5V source and supplies power to ceramic resonator OSC1, connected between pins 16 and 17 of microprocessor U1, for generating a clock signal for the system. VCC pin 18 is connected to ground and pin 20 is connected to capacitor C3, connected to common, which serves as a reference capacitor for analog to digital conversion in the microprocessor.

MOSFET transistors Q1 and Q2 are used to drive respective motor coils of the motor. The gate of MOSFET Q1 is connected through current limiting resistor R18 to the +15 volt output gates A, B, C of level shifter U2 and similarly the gate of MOSFET Q2 is connected through current limiting resistor R16 to the 15 volt output gates D, E, F of level shifter U2. Zener diodes Z3, Z4 are used to clamp the respective MOSFET Q1, Q2 gate drive signals to 18v.

Connectors P2, P3 are used to connect the coil wires to the printed circuit board. SIDAC TS2 is a SIDAC thyristor used, along with serially connected diode D6, to clamp flyback from motor coil 1 and similarly SIDAC TS3 is a SIDAC thyristor used, along with serially connected diode D5 to clamp flyback from motor coil 2.

Figure 2:
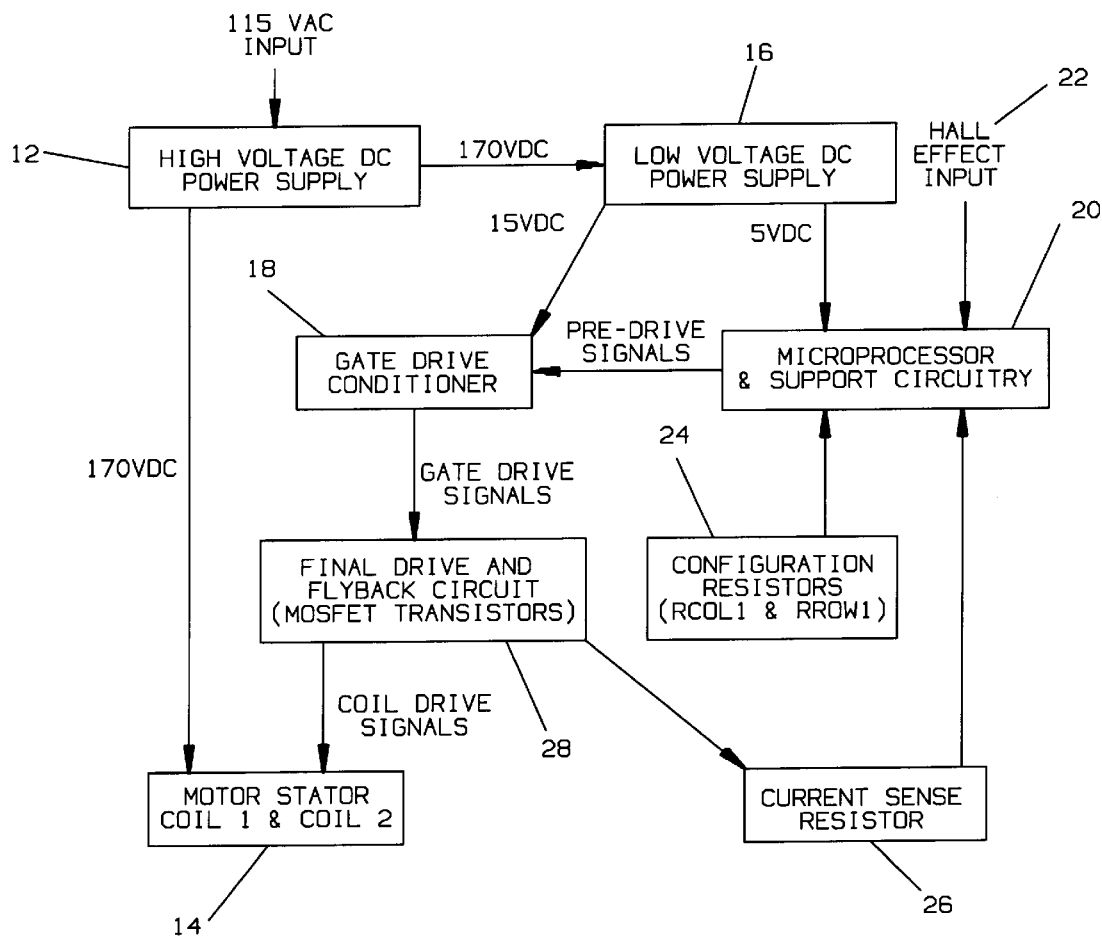
FIG. 2 is a block diagram showing the interrelationship of various portions of a DC motor and the FIG. 1 control.

With reference to FIG. 2, the high voltage DC power supply section 12 receives 115 VAC input and provides 170 VDC to the motor stator coils 1 and 2 at section 14 and to low voltage DC power supply 16 which in turn supplies 15 VDC to gate drive conditioner section 18 and 5 VDC to microprocessor and support circuitry section 20. Section 20 receives Hall Effect input at 22 and inputs from configuration resistors Rcol1 and Rrow1 section 24, and current sense resistor section 26. The gate drive conditioner section 18 provides gate drive signals to the final drive and flyback circuit section 26, comprising the MOSFET transistors which provides coil drive signals to the coils of the motor stator, section 14, and an output to current sense resistor section 26.

The phase advance operation feature of the invention will be described as follows:

There is an optimal location for the Hall Effect sensor to optimize the efficiency of a given motor load and input voltage. Unfortunately, the optimal location for efficiency is not the same as the optimal location for starting torque. If more torque is required, the Hall Effect sensor can be advanced, or moved opposite to the direction of rotation. If more efficiency is required, the sensor can be retarded (delayed), or moved in the same direction as the rotation.

Figure 3:
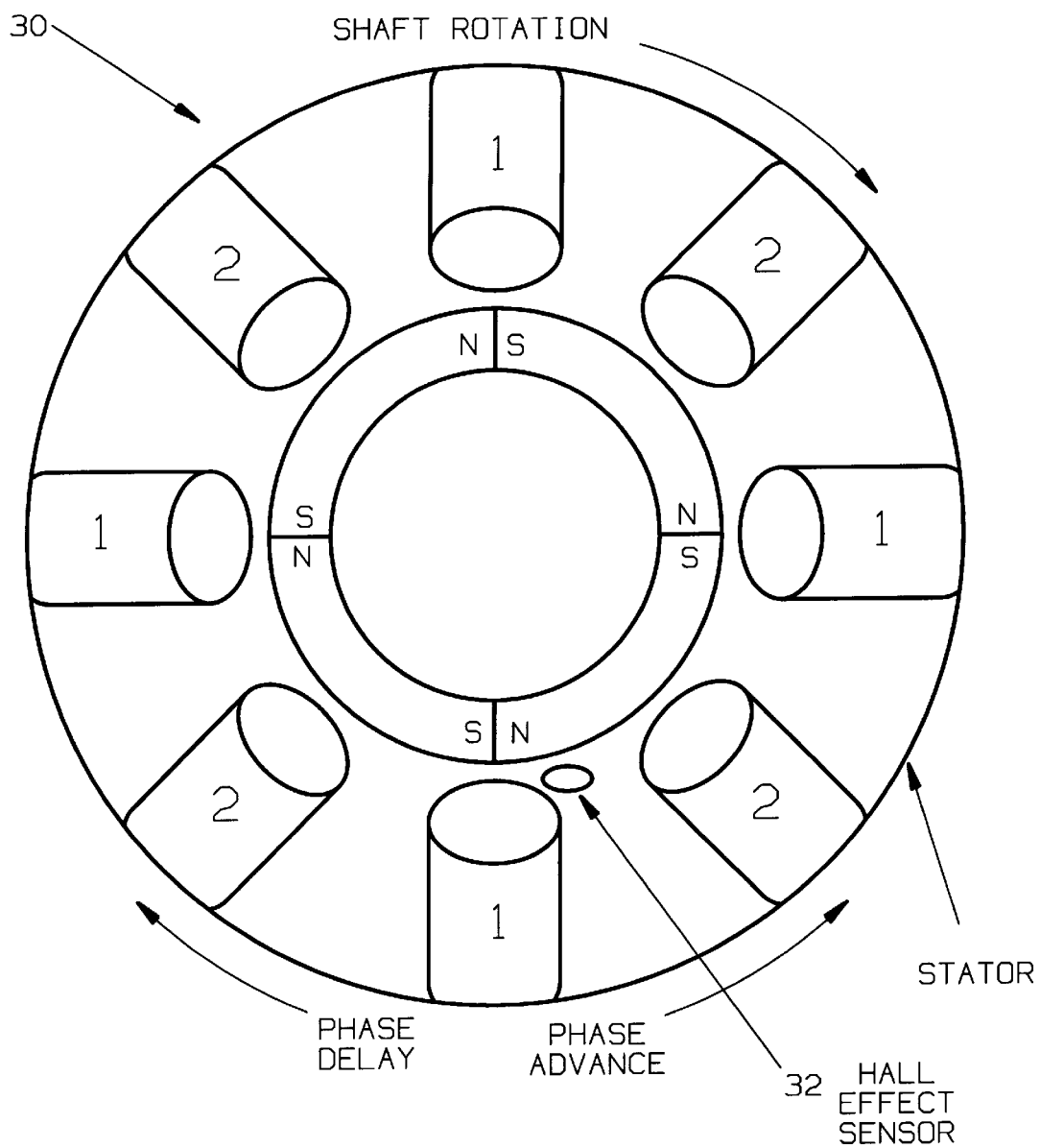
FIG. 3 is a schematic representation of a DC motor having a Hall Effect sensor to sense the position of the rotor.

As indicated in FIG. 3, this control uses a motor 30 having stator poles 1, 2 and rotor poles N, S, in which the Hall Effect sensor 32 has been placed for optimal starting torque. The control adjusts the phase advance/delay electronically to achieve the optimal combination of efficiency and torque for different motor windings, shaft load, and input voltages.

In the high voltage DC power supply, 115 VAC input line voltage is filtered by a metal oxide varistor TS1 to protect the circuit from voltage spikes. The filtered AC voltage is sent through the high voltage diode bridge and filtering capacitors described above to produce 170 VDC for driving the coils.

In the low voltage DC power supply, the output of the high voltage bridge also goes through a second diode D2 and current limiting resistor R15 into a filtering capacitor C6 and zener diode 22 to provide 12–15 VDC. The +15 VDC supply is then passed through a second current limiting resistor R4 into several filtering capacitors C1, C2 and a second zener diode Z1 to provide +5 VDC.

The microprocessor accepts +5 VDC from the low voltage supply and input from the Hall Effect sensor, configuration resistors $R_{row1}$ and $R_{col1}$, current sense resistor R17, and ceramic resonator (oscillator) OSC1. The microprocessor U1 reads the value of $R_{col1}$ and $R_{row1}$ and uses these readings to choose a row and column out of an embedded configuration matrix. The element chosen in the matrix has information on target speed, direction of rotation, and current limit level. The microprocessor then uses the input from the Hall Effect sensor 28 to detect which rotor pole is passing over the Hall Effect sensor at any given time. The microprocessor then times the pre-drive signals for each coil to correspond to the pole position of the rotor as previously described. The microprocessor modulates the pulse width of each pre-drive signal in order to track the target speed. When the motor is being driven, the microprocessor reads the current sense resistor and limits the pulse width of the pre-drive signals to keep the motor current below the target level as chosen via the matrix previously described. If the motor fails to start after 2 seconds or continues to exceed the current level, the micro stops generating pre-drive signals for a time in order to let the coils cool down prior to starting again.

In the gate drive conditioning circuit 18, the 0–5 VDC pre-drive signals are shifted to 0–15 VDC signals, then current limited by a resistor 18, 16, respectively, and clamped by a zener diode Z3, Z4, respectively, to protect the transistor gates.

In the final drive and flyback circuit, the gate drive signals switch the MOSFET drive transistors, which in turn energize and de-energize the motor coils by applying and removing high voltage power supply ground from one side of each coil (the coils are never energized at the same time). When a motor coil transitions from energized to de-energized, the energy in the coil causes a large voltage spike (flyback) opposite to the polarity of the original drive voltage. When the spike dissipates, the coil begins to generate an EMF voltage. Any current which is drawn from that voltage will actually brake the motor and reduce its efficiency. If that spike is not clamped to a low voltage, damage to the drive components or coils will occur. To clamp the flyback and allow the EMF voltage to pass, a SIDAC TS2, TS3, respectively, in series with a fast recovery diode D6, D5, respectively, is placed parallel to each coil. The SIDAC, which is similar to a TRIAC, is triggered by the flyback spike and clamps the voltage spike to a few volts which actually improves the efficiency of the motor by converting more of the energy into torque instead of dissipating it as heat. Once the flyback spike has dissipated, the SIDAC stops conducting and allows the EMF voltage to pass unencumbered.

With reference to FIGS. 4a–4d, the main routine starts with power on/reset at 100. At step 102 all outputs are off and an internal test is conducted at step 104 to verify the RAM/ROM. If the internal test does not pass, the routine cycles back to step 102, if the test does pass, all the variables are initialized at step 106 and the phase advance is set to zero. At step 108 the configuration resistors are read and used to select an element from the operating parameters matrix. At step 110, the initial duty cycle is selected based on the target speed followed by step 112 where the Hall Effect sensor is read, time is measured since the previous state transition and speed/stability are checked. At step 114, power is applied to coil 1 or coil 2 depending on the Hall Effect sensor feedback and the desired rotation. Decision step 116 then determines whether the start time has been exceeded, if not, the routine loops back to process step 112 and if it has been exceeded decision step 118 determines whether the motor speed is above 400 rpm and stable. If the decision is positive the routine goes to the run mode at step 120 and if negative decision step 122 determines whether the maximum start time (2 seconds) has expired. If not, the routine goes back to step 112 and if it has expired the routine goes to steps 124, 126 where both coils are turned off for a delay of 16 seconds to allow the motor to cool (locked rotor mode 138).

Figure 4A:
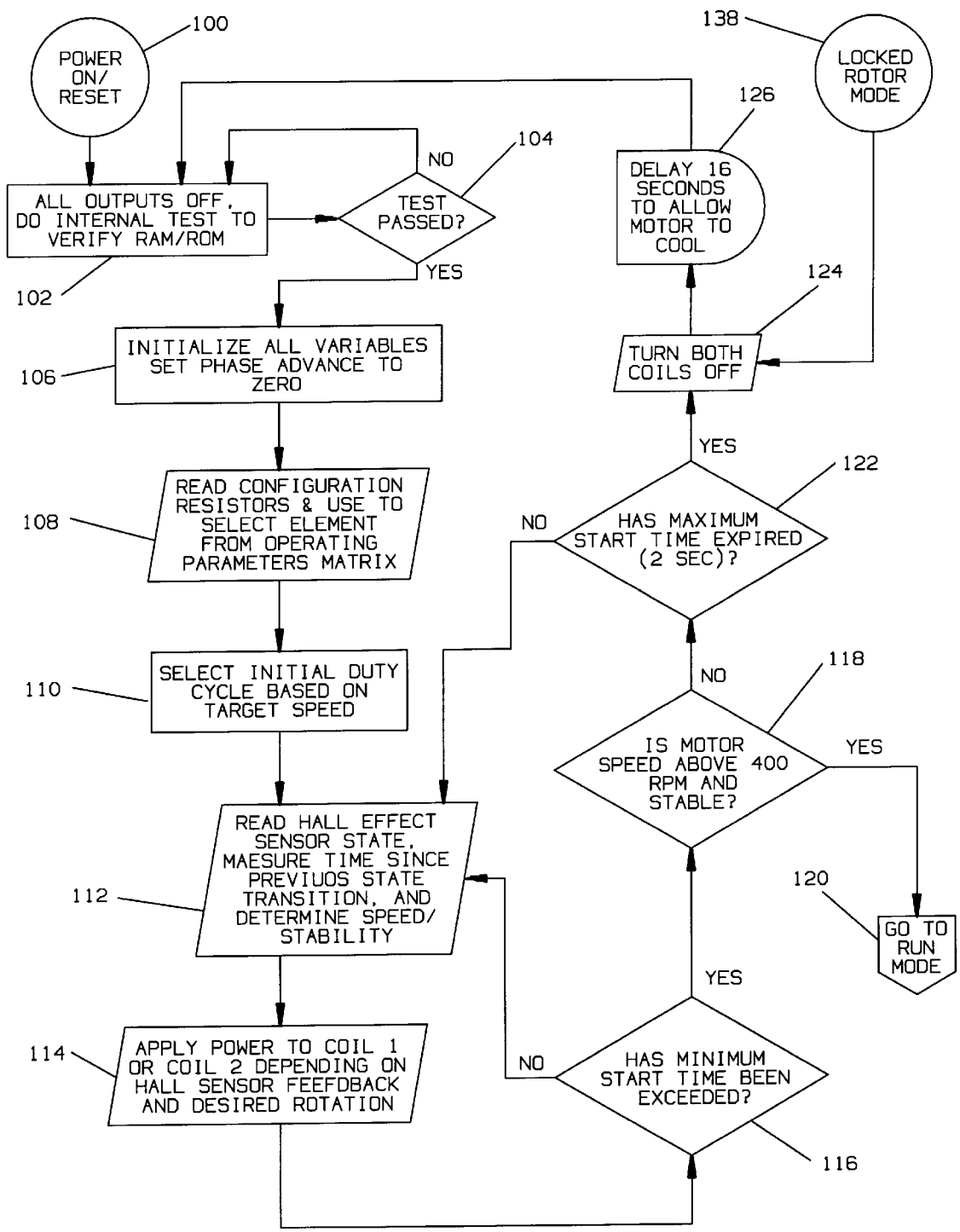
FIGS. 4a–4d are flow charts showing relevant algorithms used in practicing the invention.
Figure 4B:
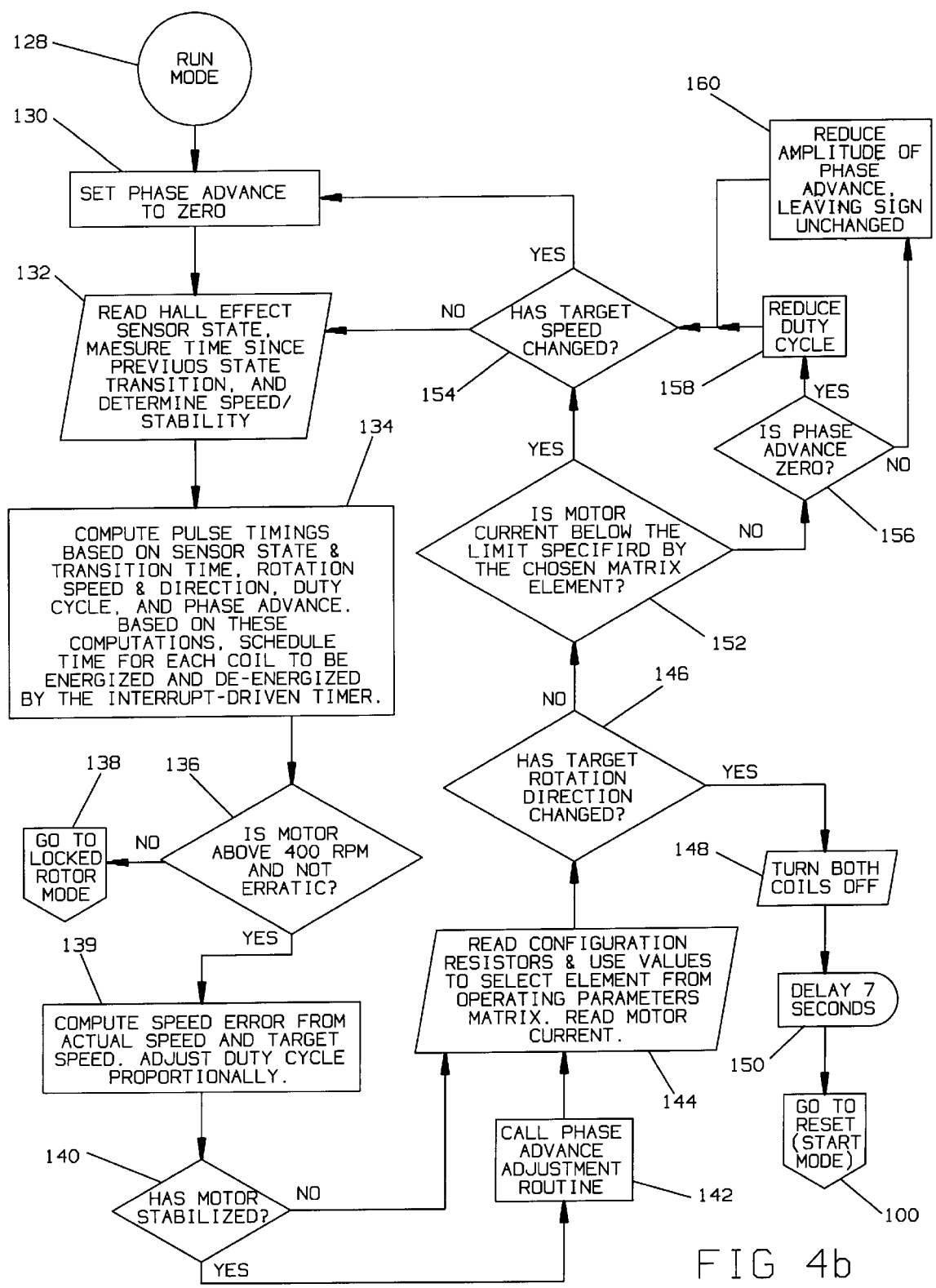

FIG. 4b shows the initiation of the run mode at 128 and at step 130 the setting of the phase advance to zero. The Hall Effect sensor state is read at step 132, the time since the last previous state transition is measured and speed/stability is determined. At step 134, the pulse timings are computed based on the sensor state and transition time, rotation, direction, duty cycle and phase advance. Based on these computations, time is scheduled for each coil to be energized and de-energized by the interrupt driven timer. The routine then goes to decision step 136 which determines whether the motor speed is above 400 rpm and not erratic; if not, the routine goes to the locked rotor mode 138. If the speed is above 400 rpm and stable the routine goes to step 139 in which the speed error is computed from actual speed and target speed and the duty cycle is adjusted proportionally. Decision step 140 looks to see if the motor has stabilized and if so the routine goes to step 142, call phase advance adjustment routine. After step 142 or following a negative decision at step 140, the routine goes to step 144 in which the configuration resistors and use values are read from the operating parameters matrix to select an element. The motor current is also read at this step. Decision step 146 looks to see if the target rotation direction has changed and if so both coils are turned off at step 148, followed by a delay of 7 seconds at step 150 and then back to reset at 100. If the direction has not changed, decision block 152 determines whether the motor current is below the limit specified by the chosen matrix element. If the current is below the limit, then step 154 looks to see if the target speed has changed and if not the routine loops back to process step 132 and if the target speed has changed, the routine goes to process step 130. If the motor current is not below the limit as determined in step 152, decision block 156 determines whether the phase advance is zero and upon a positive answer the duty cycle is reduced at step 158 with the routine then going to decision block 154. If the phase advance is not zero as determined in step 156, the routine then goes to step 160 in which the amplitude of the phase advance is reduced leaving the sign unchanged. The routine then loops to decision block 154.

Figure 4C:
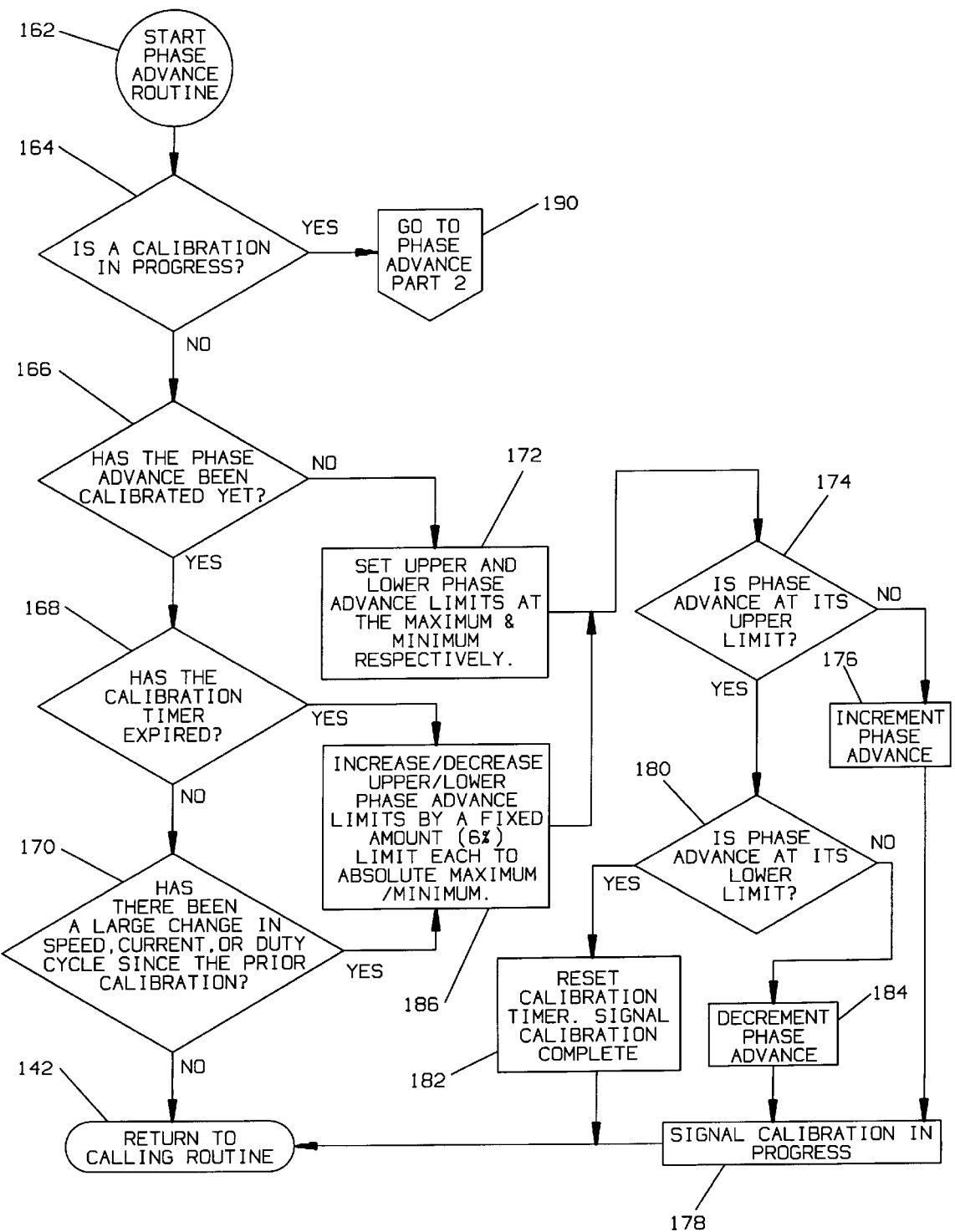
Figure 4D:
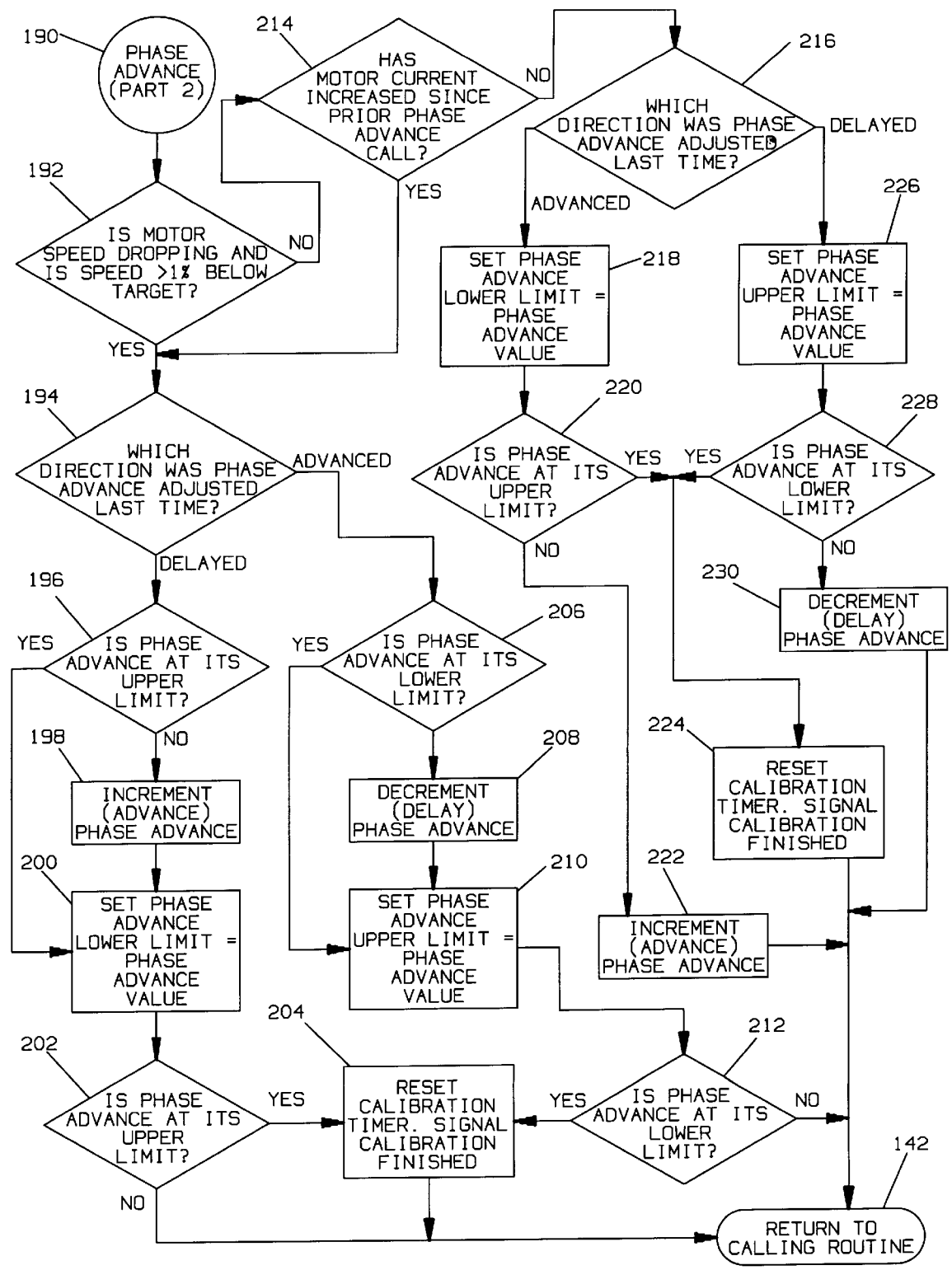

The phase advance routine, FIGS. 4c, 4d, starts at 162 and at decision step 164 the routine determines whether a calibration is in process, if so, the routine goes to part 2 of phase advance 190, if not, step 166 looks to see if the phase advance has been calibrated yet. If it has been calibrated, decision step 168 determines whether the calibration time has expired, if not, step 170 determines if there has been a large change in speed, current, or duty cycle since the prior calibration and if not, the routine returns to the calling routine, step 142. If, in decision step 166 the phase advance has not been previously been calibrated, the routine goes to process step 172 in which the upper and lower phase advance limits are set at the maximum and minimum, respectively. Decision step 174 then determines whether the phase advance is at its upper limit and if not, the phase advance is incremented at step 176. With signal calibration in progress at 178 the routine returns to the calling routine at 142. If the advance stage has reached its upper limit at step 174, then decision step 180 looks to see if the phase advance is at its lower limit. If so, the calibration timer is reset at step 182 with signal calibration complete and the routine returning to the calling routine at 142. If the phase advance has not reached its lower limit at step 180, the phase advance is decremented at step 184 with signal calibration in progress at 178 and the routine returning to the calling routine at 142. Going back to decision block 168 which determines whether the calibration timer has expired, if the answer is positive, the routine goes to step 186 which increases/decreases the upper/lower phase advance limits by a fixed amount (6%). Each is limited to an absolute maximum/minimum. From that point the routine goes to decision block 174 which checks the upper limit. If decision block 170 determines that there has been a large change in speed, current or duty cycle since the prior calibration, the routine goes to process step 186 increasing/decreasing the upper/lower limits.

In phase advance, part two at 190, decision block 192 looks to see if the motor speed is dropping and if the speed is less than 1% below the target. A positive response results in the routine going to decision block 194 which looks to see which direction the phase advance was directed last time. If the phase advance was delayed the routine then goes to decision step 196 which determines whether the phase advance is at its upper limit; if not, the routine goes to process step 198 which increments (advances) the phase advance and then to step 200 which sets the phase advance lower limit equal to the phase advance value. The routine then goes to decision block 202 which determines whether the phase advance is at its upper limit; if it is at is upper limit the routine goes to step 204 which resets the calibration timer, the signal calibration being finished and the routine then returning to the calling routine 142. If the phase advance is at its upper limit in step 202, the routine then returns directly to the calling routine 142. With respect to decision block 196, if the phase advance is already at its upper limit, the routine jumps down to step 200 in which the phase advance lower limit is set.

Going back to decision block 194, if the previous phase advance adjustment had been advanced, the routine goes to decision block 206 which determines whether the phase advance is at its lower limit. If not, process step 208 decrements (delays) the phase advance and then step 210 sets the phase advance with the upper limit equal to the phase advance value and then decision block 212 determines if the phase advance is at its lower limit. If not, the routine returns to the calling routine at 142 and if it has reached its lower limit the routine goes to process step 204 which resets the calibration timer. If the phase advance had already reached its lower limit at decision step 206, the routine jumps down to step 210 which sets the phase advance upper limit.

Going back to decision block 192 which determines if the motor speed is dropping and if speed is less than 1% below target, if the response is negative the routine goes to decision step 214 which determines whether the motor current has increased since the prior phase advance call, is so, the routine goes to decision block 194 which looks to determine the direction of the last phase advance adjustment; and if not, the routine goes to decision block 216 which determines the direction of the last phase advance adjustment. If the phase adjustment had been advanced, the lower limit of the phase advance is set equal to the phase advance value at step 218 and decision block 220 then determines whether the phase advance is at its upper limit, if not, the phase advance is incremented (advanced) at step 222 and then the routine returns to the calling routine at 142. If the phase advance has reached its upper limit at decision block 220, the routine goes to process step 224 which resets the calibration timer with the signal calibration being finished and the routine returning to the calling routine at 142.

Going back to decision block 216, if the last phase advance adjustment had been delayed, the routine goes to step 226 which sets the upper limit of the phase advance equal to the phase advance value and then decision block 228 determines whether the phase advance is at its lower limit. If not, the phase advance is decremented (delayed) at step 230 before returning to the calling routine at 142. If the phase advance has reached its lower limit at decision block 228, then the routine goes to step 224 in which the calibration timer is reset with the signal calibration being finished.

Although the invention has been described with regard to a specific preferred embodiment thereof, variations and modifications will become apparent to those skilled in the art. It is therefore the intention that the appended claims be interpreted as broadly as possible in view of the prior art to include all such variations and modifications.

What is claimed:

1. A motor control for driving a half-wave DC brushless motor having first and second motor stator coils, stator and rotor poles and a sensor disposed in the motor for sensing the position of the rotor comprising high and low voltage DC power supplies, a microprocessor having input and output ports, a gate drive conditioner coupled to an output of the microprocessor and controlled by pre-drive signals therefrom for providing gate drive signals to a final drive and flyback circuit including a MOSFET transistor having a breakdown voltage $V_{breakdown}$ for each coil winding, each MOSFET transistor providing a coil drive signal for a respective stator coil when gated on by a gate drive signal, current flowing through a respective coil when a MOSFET transistor is gated on and when the MOSFET transistor is gated off the energy within the respective coil collapsing tending to create a large voltage potential $V_{flyback}$ across the MOSFET transistor, the flyback circuit including a SIDAC serially connected to a diode connected across a respective coil, the SIDACs selected to trigger at a selected voltage higher than $V_{emf}$ and lower than $V_{breakdown}$ so that when the flyback voltage reaches $V_{breakdown}$ and the respective SIDAC is triggered, the SIDAC acts like a diode to clamp the flyback energy to a few volts and when not triggered the respective SIDAC allows $V_{emf}$ to float.

2. A motor control according to claim 1 in which the sensor is a Hall Effect sensor.

3. A motor control according to claim 1 further comprising a configuration resistor and a reference resistor connected between a microprocessor supply voltage and common to form a SPEEDSET signal for the target speed and direction, the SPEEDSET signal connected to a connector to enable speed and direction changes for the motor.

4. In a motor control for driving a half-wave DC brushless motor having first and second motor stator coils, stator and rotor poles and a sensor disposed in the motor for sensing the position of the rotor and providing a signal, a method for optimizing performance and efficiency of the motor operation by advancing or delaying phase timings wherein a particular coil of a motor is commutated when the sensor provides a signal and wherein a positive phase advance causes the sensor to provide a signal prior to the rotor and stator poles overlapping and a negative phase advance causes the sensor to provide a signal after the rotor and stator poles start to overlap and wherein the relative phase advance is the difference between the point at which the sensor provides a signal and the actual commutation point, the actual phase advance being equal to the physical phase advance plus the relative advance, the method comprising the steps of, starting the motor with a relative phase advance of zero degrees, after the motor is running allowing to motor to stabilize, determining if the motor has reached a target speed, if the motor has not reached the target speed, retarding the timing a selected unit, allowing the motor to stabilize, then determining whether the motor speed is within a selected tolerance, reiterating the steps of checking the running speed versus target speed and checking the running speed relative to the selected tolerance until the motor loses speed, a preset delay limit is reached or the sum of phase delay time and drive pulse time approaches a total pole dwell time.

5. A method according to claim 4, further comprising the steps, after the motor has reached a target speed, determining whether the motor has fallen below the target speed, if the motor has fallen below the target speed, advancing the motor a selected unit, allowing the motor to stabilize, then determining whether the motor is within a selected tolerance, reiterating the steps of checking the running speed versus the target speed and checking the running speed relative to the selected tolerance until the target speed is reached, a relative maximum speed is realized or a preset advance limit is reached.

6. A method according to claim 4 further including the step of limiting start-up time to a selected period of time and if the motor does not start within this time or the signals are overly erratic, shutting down the motor for another selected period of time to allow the motor and control to cool.

7. A method according to claim 6 wherein the selected period for the start-up time is approximately two seconds and the selected shut down period is approximately sixteen seconds.

* * * * *